United States Patent [19]
Damm

[11] Patent Number: 6,107,571
[45] Date of Patent: *Aug. 22, 2000

[54] CABLE SEAL

[75] Inventor: Jesper Damm, Hvidovre, Denmark

[73] Assignee: N.V. Raychem S.A., Kessel-Lo, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/981,941

[22] PCT Filed: Jun. 18, 1996

[86] PCT No.: PCT/GB96/01448

§ 371 Date: Mar. 2, 1998

§ 102(e) Date: Mar. 2, 1998

[87] PCT Pub. No.: WO97/02636

PCT Pub. Date: Jan. 23, 1997

[30] Foreign Application Priority Data

Jun. 30, 1995 [GB] United Kingdom .................... 9513364

[51] Int. Cl.[7] ................................................. H02G 15/02
[52] U.S. Cl. ................... 174/74 R; 174/77 R; 174/75 C; 174/72 C
[58] Field of Search ............................... 174/72 C, 77 R, 174/65 R, 65 G, 75 C

[56] References Cited

U.S. PATENT DOCUMENTS

| | | | |
|---|---|---|---|
| 4,704,499 | 11/1987 | Faust | 174/92 |
| 4,822,954 | 4/1989 | Rebers et al. | 174/93 |
| 4,857,672 | 8/1989 | Rebers et al. | 174/93 |

FOREIGN PATENT DOCUMENTS

| | | | |
|---|---|---|---|
| 0 191 609 A1 | 2/1986 | European Pat. Off. | H02G 15/013 |
| 0 320 236 A2 | 12/1988 | European Pat. Off. | H02G 15/013 |
| 2 501 926 | 3/1981 | France | H02G 1/14 |
| WO 81/01487 | 5/1981 | WIPO | H02G 15/10 |
| WO 97/02636 | 1/1997 | WIPO | H02G 15/013 |

Primary Examiner—Kristine Kincaid
Assistant Examiner—William H Mayo, III
Attorney, Agent, or Firm—Allen, Dyer, Doppelt, Milbrath & Gilchrist, P.A.

[57] ABSTRACT

A seal for sealing between a cable and a casing enclosing part of the cable includes a wall member having a plurality of substantially concentric removable portions which may selectively removed to provide a cable aperture of required diameter through the wall member. The seal also includes sealing material retained by the wall member, which seals, in use, around a cable extending through the cable aperture in the wall member. When a removable portion of the wall member is removed, a corresponding portion of the sealing material is also removed, thereby providing a cable aperture of the required diameter through the sealing material.

13 Claims, 3 Drawing Sheets

CABLE SEAL

This case is a continuation of PCT/GB96/01448, filed Jun. 18, 1996.

FIELD OF THE INVENTION

The present invention relates to cable seal for sealing between a cable and a casing enclosing part of the cable. The casing may comprise a cable slice closure casing, and consequently the invention further relates a cable splice closure including one or more cable seals. The casing may alternatively be for attaching to, and sealing, an end of a duct, and consequently the invention additionally relates to a duct sealing apparatus including one or more such cable seals. The term cable is meant to include a telecommunications cable (either conductive or optical fiber), an electrical cable or other conductive cable, a wire or an optical fiber.

BACKGROUND OF THE INVENTION

U.S. Pat. Nos. 4,857,672 and 4,822,954 each disclose a cable closure end cap which may be adapted to accommodate more than one cable extending into an end of a cable closure. The end cap comprises first and second end cap members positioned against one another and forming a wall member which has at least one longitudinal cable bore. Each cable bore is defined by a plurality of substantially concentric substantially cylindrical ring members spaced from one another by transverse wall sections. The concentric ring members can be selectively cut out to accommodate a range of sizes of cable.

SUMMARY OF THE INVENTION

According to a first aspect of the present invention, there is provided a seal for sealing between a cable and a casing enclosing part of the cable, comprising:

(a) a wall member having a plurality of substantially concentric removable portions which may be selectively removed to provide a cable aperture of required diameter through the wall member; and (b) sealing material retained by the wall member, which seals, in use, around a cable extending through the cable aperture in the wall member; wherein, in use, when a removable portion of the wall member is removed, a corresponding portion of the sealing material is also removed, preferably automatically, thereby providing a cable aperture of the required diameter through the sealing material.

The seal according to the invention has the advantage that, in addition to each wall member, it includes sealing material retained by the wall member, and when a removable portion of the wall member is removed, a corresponding portion of the sealing material is also removed, preferably automatically, thereby providing a cable aperture of the required diameter through the sealing material. This is advantageous because it provides a seal which is able to accommodate a range of sizes of cable while providing a substantially watertight seal around the cables by virtue of the sealing material. It has the further advantage that the seal is provided with a sufficient amount of sealing material for sealing any of a range of sizes of cable, and in order to adapt the seal to fit a particular size of cable, the installer merely needs to remove the appropriate amount of sealing material.

The seal may have one or a plurality of cable apertures extending through it. If two or more such apertures are present, preferably each aperture has its own series of substantially concentric removable portions. The seal according to the invention may or may not be supplied with one or more cable apertures already extending through it, i.e. the installer may or may not have to remove a portion of the seal in order to obtain an aperture. If the seal is supplied with one or more cable apertures already extending through it, it is preferably also provided with a plug for each aperture, in case one or more of the apertures will not contain a cable.

Preferably the seal further comprises a second wall member substantially parallel to the first wall member and having a plurality of substantially concentric removable portions corresponding to the first wall member and which may be selectively removed to provide a corresponding cable aperture of required diameter through the second wall member, the sealing material being retained between the two wall members. Advantageously, in use, the wall members may be forced towards each other, thereby applying compression to the sealing material and displacing some of it laterally inwards against a cable extending therethrough. Preferably such longitudinal compression of the sealing material also displaces some of the sealing material laterally outwards against the casing. In this way, a tight seal between the cable and the casing can preferably be achieved.

The removal of the removable portions of the seal is preferably achieved by cutting, tearing or pulling the portions away from the remainder of the seal. Advantageously, between the removable portions of the wall member(s) are portions of the wall member(s) of reduced thickness and/or strength which may, for example, be cut, and/or which is frangible. Alternatively, the removable portions of the wall member(s) may comprise interlocking portions for example, which may be separated.

The removable portions are preferably substantially annular or semi-annular, thereby to conform to a cable that has a generally circular cross-section. However, a wide variety of shapes are possible, depending on the particular requirements of the seal. A single cable aperture may, for example, be required to accommodate two or more cables, in which case the removable portions may, for example, be oval or semi-oval in cross-section.

In preferred embodiments of the invention, each removable portion of each wall member further comprises at least one retaining portion, such that for each diameter of cable aperture which may be selected, there is at least one retaining portion which, in use, substantially prevents exudation of the sealing material next to the cable through the cable aperture in the wall member. This has the advantage that no matter which diameter of cable needs to be sealed, and consequently no matter how many (if any) removable portions need to be removed from the seal, the retention of the sealing material is normally equally good.

Each retaining portion(where present) preferably extends, in use, between part of the sealing material and a cable extending through the seal. More preferably, each retaining portion preferably extends generally, or substantially, parallel to such a cable or axially inwardly. The retaining portions may, for example, project from a major surface of each wall member which faces towards the sealing material. Each retaining portions is preferably separated by a gap from an adjacent retaining portion, i.e. from a retaining portion which comprises part of an adjacent removable portion. There may be sealing material and/or air between each adjacent retaining portion. In embodiments in which the seal comprises a pair of wall members having sealing material between them, preferably each wall member has a series of retaining portions, and more preferably the retaining portions of each series are spaced apart from each other, at least before the wall members are forced towards each other to compress the sealing material.

Advantageously, each retaining portion (where present) may be flexible, e.g. so that it can conform to a cable. More advantageously, in use the sealing material is compressed, thereby causing each retaining portion closest to a cable extending through the seal to be flexed against the cable. This has the advantage that the compression of the sealing material, which might otherwise result in exudation of the sealing material out of the cable aperture, actually enhances, or at least does not worsen, its retention, since by causing the retaining portion to be flexed against the cable, it normally substantially closes a gap between the wall member and the cable through which the sealing material might otherwise have escaped.

Each retaining portion may advantageously have substantially the same cross-sectional shape as the remainder of the removable portion of which it comprises a part. For example, each retaining portion may be circular, semi-circular, oval, or semi-oval in cross-section, e.g. being generally cylindrical or semi-cylindrical in shape. Additionally or alternatively each retaining portion may comprise one or more flaps or the like.

Each removable portion of sealing material is preferably separated from an adjacent removable portion of the wall member by a gap. This gap may facilitate the removal of the wall member and sealing material portions, for example by providing a region free from sealing material for a knife or other cutting tool to cut. This region where there is a gap between some of the sealing material and a portion of the wall member may be spanned by a frangible portion, or a portion of reduced thickness and/or strength, of the wall member. Advantageously, if, in use, the sealing material of the seal is compressed, some of the sealing material is forced into each such gap.

The seal according to the invention is preferably split to allow side-entry of a cable into each cable aperture. The seal may, for example, be split into two or more separate or separable pieces, e.g. half pieces, each piece having part of each cable aperture, which pieces may be brought together to form the one or more cable apertures. Alternatively, the seal may not be completely split, i.e. the split may comprise a slit or a slot extending from the periphery of the seal to each cable aperture, so that each cable aperture may be opened-out to receive a cable by side-entry.

Each wall member is preferably harder (e.g. as measured by a Stevens-Volland texture analyser) than the sealing material. The wall member(s) is/are preferably formed from a plastic material, e.g. polypropylene, and/or from an elastic material, e.g. an elastomer, especially natural or synthetic rubber. The sealing material ray, for example, comprise gel (described in more detail below), polymeric foam, elastomeric material and/or mastic or the like. It may additionally or alternatively comprise adhesive material, especially pressure-sensitive adhesive.

It is preferred that the sealing material have a Stevens-Volland hardness (i.e. a hardness as measured by a Stevens-Volland texture analyser) of no more than 80 g, more preferably no more than 70 g, especially no more than 60 g. A particularly preferred hardness range is 45 g to 60 g. Additionally or alternatively, the sealing material preferably has a cone penetration as measured by ASTM D217 of at least 50 ($10^{-1}$ mm), more preferably at least 100 ($10^{-1}$ mm), even more preferably at least 200 ($10^{-1}$ mm), and preferably no greater than 400 ($10^{-1}$ mm), especially no greater than 350 ($10^{-1}$ mm).

As mentioned above, a particularly preferred sealing material comprises gel. The gel may, for example, comprise silicone gel, urea gel, urethane gel, thermoplastic gel, or any suitable gel or gelloid sealing material. Preferred gels comprise liquid (e.g. oil)-extended polymer compositions. The polymer composition of the gel may for example comprise an elastomer, or a block copolymer having relatively hard blocks and relatively elastomeric blocks. Examples of such copolymer include styrenediene block copolymers, for example styrene-butadiene or styrene-isoprene diblock or triblock copolymers e.g. as disclosed in international patent publication number WO 88/00603. Preferably, however, the polymer composition comprises one or more styrene-ethylene-propylene-styrene block copolymers, for example as sold under the Trade Mark "SEPTON" by Kuraray of Japan. The extender liquids employed in the gel preferably comprise oils. The oils may be hydrocarbon oils, for example paraffinic or napthenic oils, synthetic oils for example polybutene or polypropene oils, and mixtures thereof. The preferred oils are mixtures of non-aromatic paraffins and napthenic hydrocarbon oils. The gel may contain additives, e.g. such as moisture scavengers (e.g. Benzoyl chloride), antioxidants, pigments, and fungicides.

As indicated above, a preferred use for the seal according to the first aspect of the invention is as part of a cable splice closure. Accordingly, a second aspect of the invention provides a cable splice closure, comprising a casing to enclose the cable splice, and one or more seals according to the first aspect of the invention, to seal an end of the casing.

Another preferred use for the seal is to seal a duct which has one or more cables extending through it. Accordingly a third aspect of the invention provides a duct sealing apparatus, comprising a casing for attaching to, and sealing, an end of a duct, and one or more seals according to the first aspect of the invention, to seal between the casing and one or more cables extending through the casing and the duct.

BRIEF DESCRIPTION OF THE DRAWINGS

The invention will now be described, by way of example, with reference to the accompanying drawings, of which.

DETAILED DESCRIPTION OF THE PREFERRED EMBODIMENTS

Figure 1A:
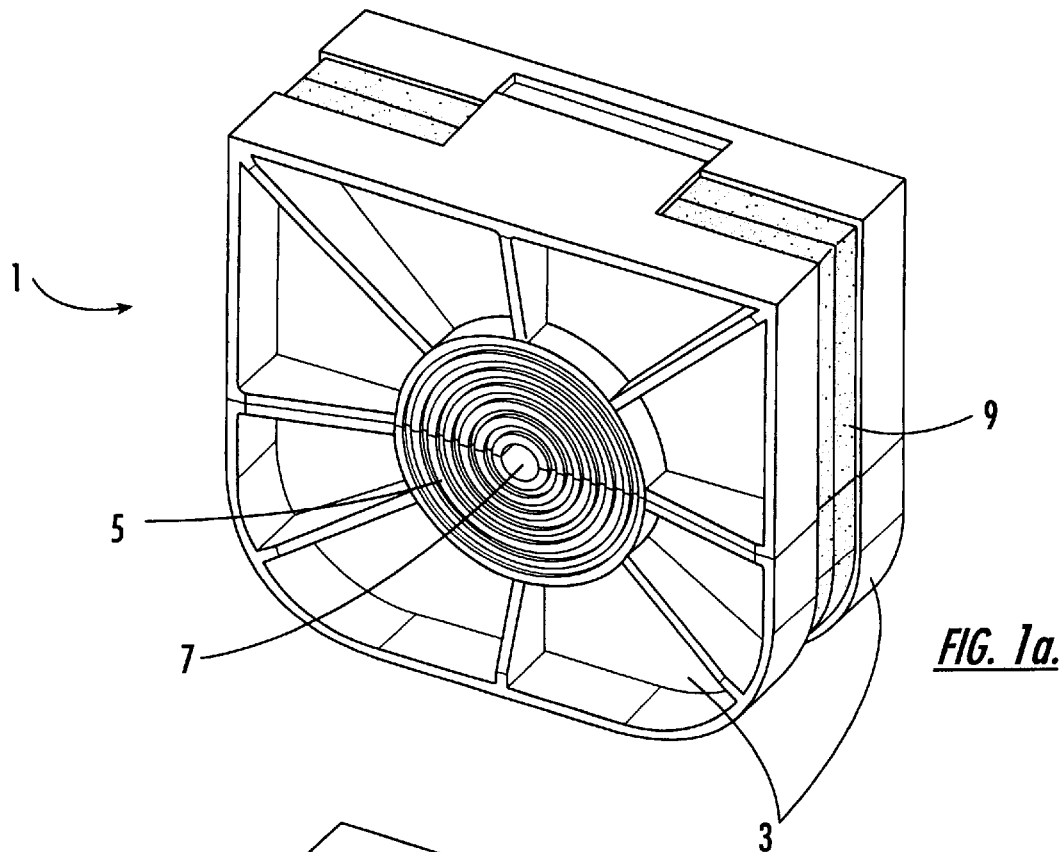
FIGS. 1a and 1b show a seal according to the invention.
Figure 1B:
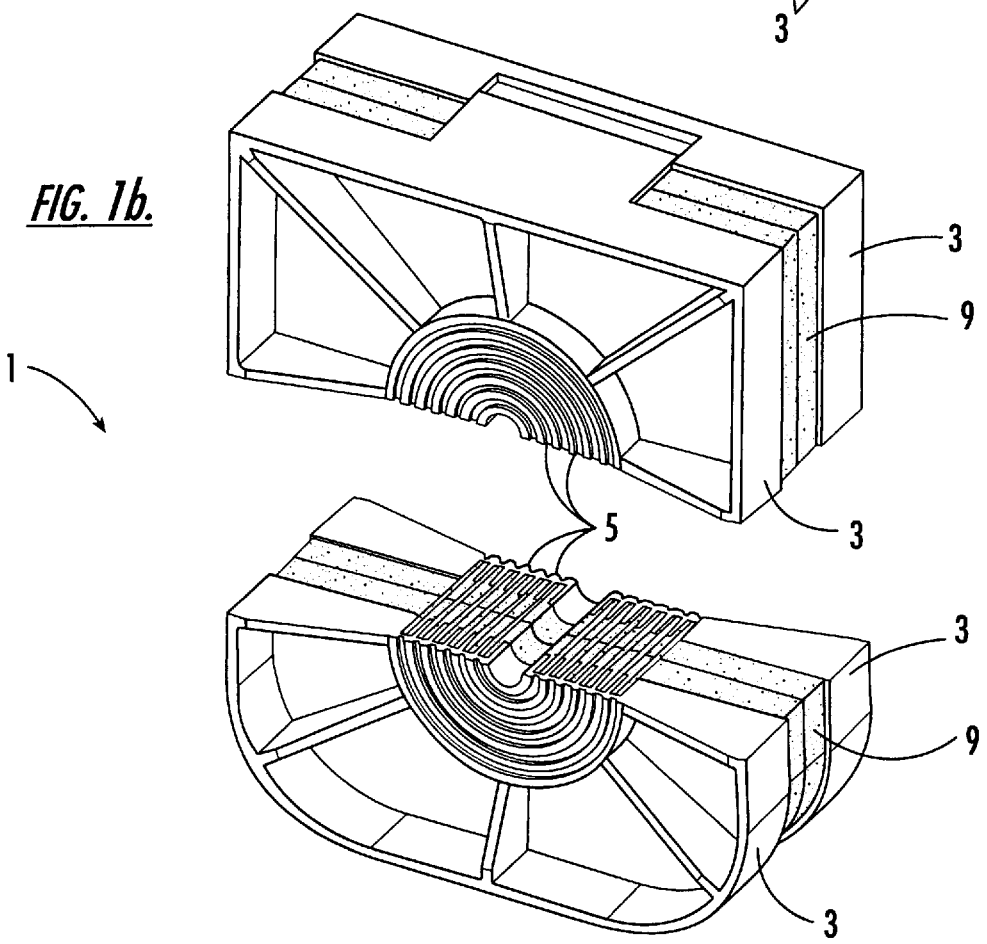

FIGS. 1a and 1b show a seal 1 according to the invention, comprising a pair of wall members 3 having a plurality of substantially concentric removable portions 5 which may be selectively removed to provide a cable aperture 7 of required diameter through the wall members. Between the wall members 3 is sealing material 9 (preferably gel). In use, the wall members 3 are forced closer together, causing some of the sealing material between them to be displaced laterally inwards into the cable aperture 7, thereby sealing against a cable in the aperture, and laterally outwards around the periphery of the seal, thereby sealing against a casing in which the seal is placed. As shown in FIG. 1b, the seal 1 is split into two separate pieces through the cable aperture 7, each piece having part of the cable aperture, to allow side-entry of a cable into the aperture. The sealing material in each piece advantageously seals the split when the two pieces are brought together.

Figure 2:
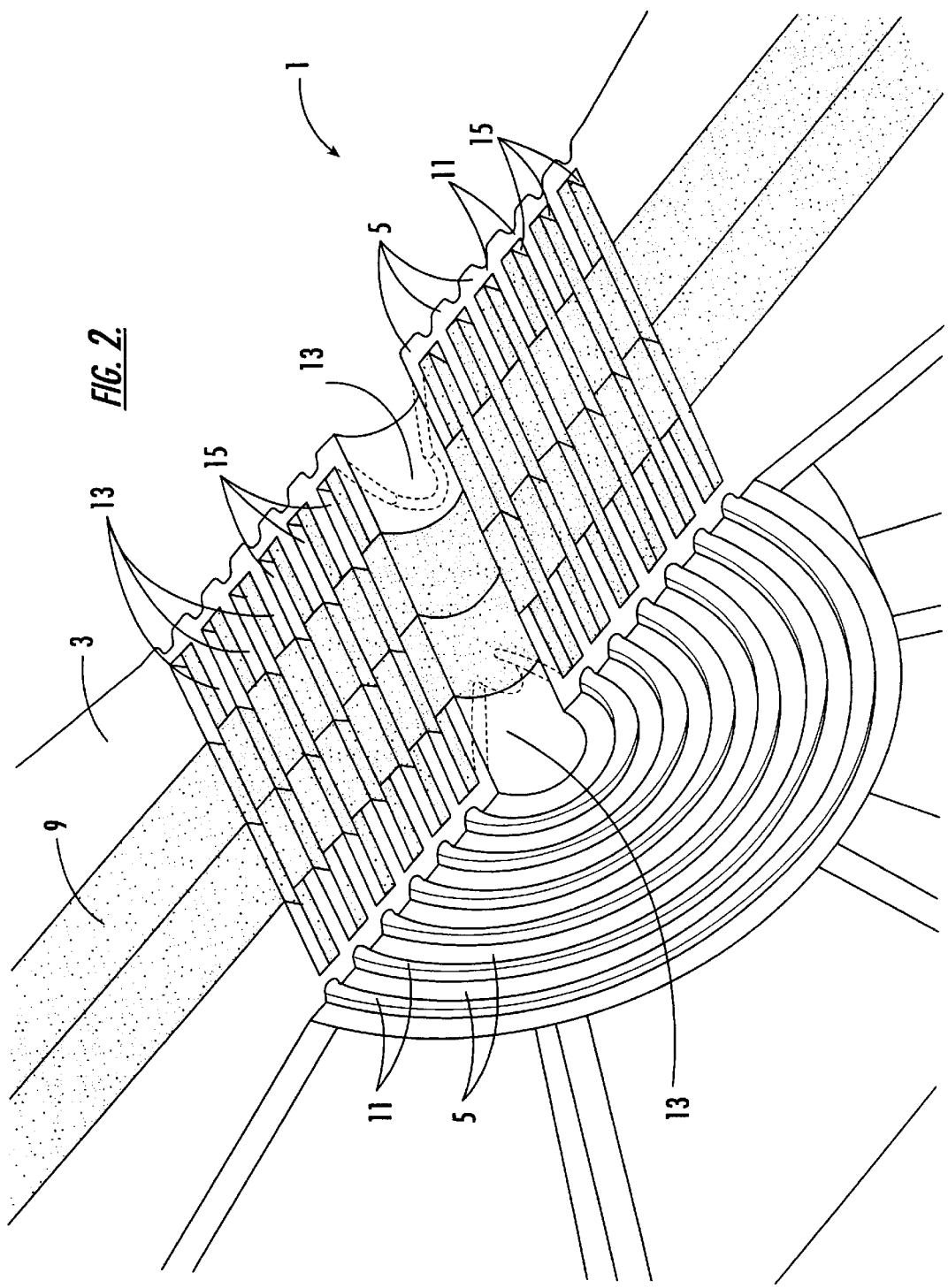
FIG. 2 shows details of the seal shown in FIG. 1.

FIG. 2 shows the cable aperture region of one of the pieces of the seal 1, in greater detail. The piece has half of the cable aperture 7 in the form of a semi-cylindrical recess. The diameter of the cable aperture without any of the removable portions 5 removed is advantageously of the correct size for the smallest diameter cable to be sealed by the seal. The seal may, alternatively, have no cable aperture initially, an aperture only being provided upon the removal of a central removable portion. The concentric removable portions 5 of each wall member are separated from each other by concentric portions 11 of reduced thickness which can be cut with a cutting tool (e.g. a knife).

An integral part of each removable portion 5 of each wall member is a retaining portion 13 for retaining sealing material next to a cable in the cable aperture, which comprises a semi-cylindrical portion of the wall member projecting, substantially co-axially with the cable aperture 7, from the major surface of the wall member which faces towards the sealing material. Each retaining portion 13 is advantageously flexible, and when the sealing material 9 is put under compression (e.g. by forcing the wall members 3 closer together), the sealing material preferably forces the retaining portions closest to a cable in the cable aperture to be flexed against the cable, e.g. as shown in dotted outline in FIG. 2. To facilitate this flexing of the retaining portions, they may be slit so that they each comprise two or more flaps or the like. Because each removable portion 5 has its own retaining portion 13, for each diameter of cable aperture which may be selected there is at least one retaining portion which substantially prevents exudation of the sealing material next to the cable in the cable aperture.

It can also be seen from FIG. 2 that each removable portion 5 of the wall members 3 has a corresponding portion of sealing material 9 which is removed when, in use, the removable portions 5 are removed. Each portion of sealing material 9 which is so removed is separated from each adjacent removable portion 5 of the wall members by a gap 15. The cuttable portions 11 if reduced thickness in the wall members, span these gaps 15, and the fact that these gaps are present means that the removal of each corresponding portion of sealing material is made easier than would otherwise be the case. It is preferred that the sealing material is made easier than would otherwise be the case. It is preferred that the sealing material have a high degree of cohesiveness to facilitate the production of the gaps 15, and for this purpose, gel is an ideal sealing material. It is particularly preferred that the gaps 15 extend from one wall member 3 to the other, so that each corresponding portion of sealing material is entirely separated from its adjacent portion(s). However, this may not always be possible, and it is generally sufficient for the gaps 15 to be between the sealing material 9 and each adjacent retaining portion 13 immediately adjacent to the inwardly-facing major surface of each wall member 3. When the sealing material is compressed in use, some of the sealing material may advantageously substantially fill the gaps 15. Preferably, therefore, there is sufficient sealing material to fill the gaps 15 and to seal against a cable in the aperture.

Figure 3A:
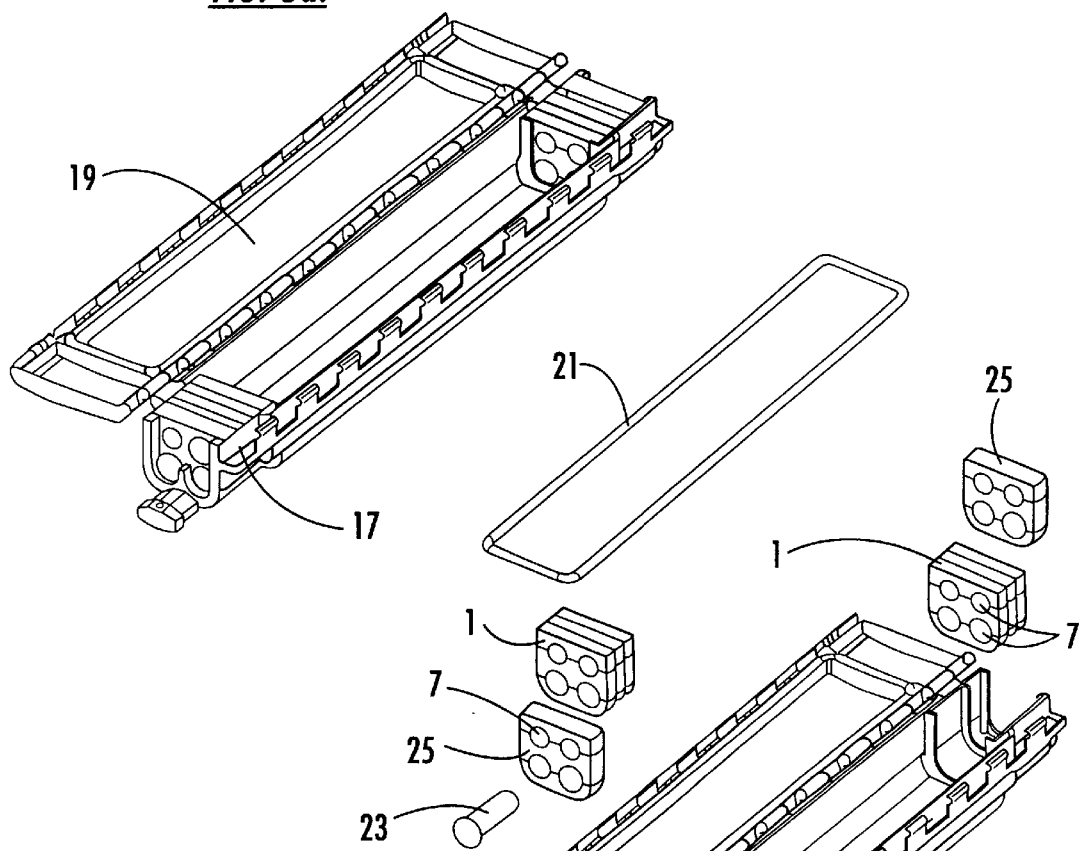
FIGS. 3a–3c show a cable splice closure including two seals according to the invention.
Figure 3B:
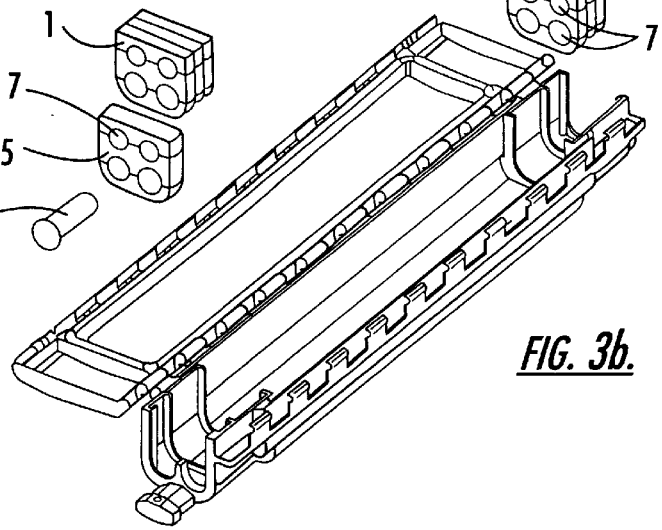
Figure 3C:
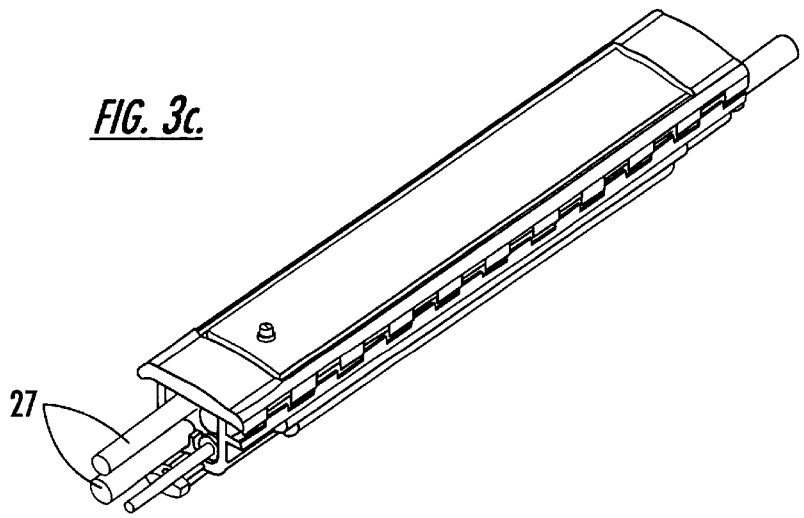

FIGS. 3*a*–3*c* show a preferred cable splice closure utilizing cable seals according to the invention. The closure comprises a casing having a base 17 and a cover 19, and an o-ring seal 21 sealing between the base and the cover. The seals 1 are inserted into the ends of the base 17, and the cover 19 is closed on top of them. The seals 1 shown in FIG. 3 each have four cable apertures 7. Plugs 23 may be provided to block-off any unused cable apertures. Also shown are fastening devices 25 to fasten the cables 27 to the casing.

What is claimed is:

1. A seal for a cable casing enclosing part of a cable, the seal comprising:

(a) at least one wall member including a plurality of substantially coaxial removable portions, each of said substantialy coaxial removable portions comprising an end wall portion extending in a radially inward direction of the seal, and a retaining portion extending in an axially inward direction of the seal from the end wall portion, the axially inward direction being transverse to the radially inward direction, each of the plurality of substantially coaxial removable portions being selectively removable to define a cable aperture of a corresponding required diameter through the at least one wall member; and (b) sealing material retained by the at least one wall member, to seal around the cable when extending through the cable aperture in the at least one wall member, and including removable portions each of which corresponds to one of the plurality of substantially coaxial removable portions of the at least one wall member, and each of which is also removed when a corresponding one of the plurality of substantially coaxial removable portions of the at least one wall member to which one of the removable portions of the sealing material corresponds is removed, to define the cable aperture of the corresponding required diameter through the sealing material.

2. A seal according to claim 1, wherein the at least one wall member comprises a pair of opposing wall members which are substantially parallel to each other and which sandwich the sealing material therebetween.

3. A seal according to claim 2, wherein the pair of opposing wall members can be forced towards each other to thereby compress and displace the sealing material laterally against the cable when the cable is extending through the seal.

4. A seal according to claim 1, wherein for each required diameter of the cable aperture which can be selected, the retaining portion of one of the plurality of substantially coaxial removable portions can substantially prevent the sealing material from flowing through the cable aperture in the at least one wall member when the cable is extending through the seal.

5. A seal according to claim 4, wherein the retaining portion of one of the plurality of substantially coaxial removable portions which substantially prevents the sealing material from flowing through the cable aperture, extends between a part of the sealing material and the cable when the cable is extending through the seal.

6. A seal according to claim 5, wherein each retaining portion is flexible.

7. A seal according to claim 6, wherein the sealing material is compressible to thereby cause the retaining portion of one of the plurality of substantially coaxial removable portions which substantially prevents the sealing material from flowing through the cable aperture, to be flexed against the cable when the cable is extending through the seal.

8. A seal according to claim 4, wherein a part of each removable portion of sealing material is adjacent to one of the retaining portions of the plurality of substantially coaxial removable portions and separated from portions retaining portions by a gap.

9. A seal according to claim 8, wherein the sealing material is compressible to thereby allow some of the sealing material to be forced into each gap.

10. A seal according to claim 1, further comprising a split to allow side-entry of the cable into the cable aperture.

11. A seal according to claim 1, wherein the at least one wall member and the sealing material define a plurality of cable apertures extending therethrough.

12. A cable splice closure comprising:

a casing to enclose the cable splice, and one or more seals to seal an end of the casing, each of the one or more seals comprising
  (a) a wall member including a plurality of substantially coaxial removable portions, each of said substantially coaxial removable portion comprising an end wall portions extending in a radially inward direction of the seal, and a retaining portion extending in an axially inward direction of the seal from the end wall portion, the axially inward direction being transverse to the radially inward direction, and each of said substantially coaxial removable portions being selectively removable to define a cable aperture of a corresponding required diameter through the wall member; and
  (b) sealing material retained by the wall member, to seal around a cable when extending through the cable aperture in the wall member, and including removable portions each of which corresponds to one of the plurality of substantially coaxial removable portions of the wall member, and each of which is also removed when a corresponding one of the plurality of substantially coaxial removable portions of the wall member to which one of the removable portions of the sealing material corresponds is removed, to define the cable aperture of the corresponding required diameter through the sealing material.

13. A duct sealing apparatus comprising:

a casing for attaching to, and sealing, an end of a duct, and one or more seals to seal between the casing and one or more cables extending through the casing and the duct, each of the one or more seals comprising
  (a) a wall member including a plurality of substantially coaxial removable portions, each of said substantially coaxial removable portions comprising an end wall portion extending in a radially inward direction of the seal, and a retaining portion extending in an axially inward direction of the seal from the end wall portion, the axially inward direction being transverse to the radially inward direction, and each of said substantially coaxial removable portions being selectively removable to define a cable aperture of a corresponding required diameter through the wall member; and
  (b) sealing material retained by the wall member, to seal around a cable when extending through the cable aperture in the wall member, and including removable portions each of which corresponds to one of the plurality of substantially coaxial removable portions of the wall member, and each of which is also removed when a corresponding one of the plurality of substantially coaxial removable portions of the wall member to which one of the removable portions of the sealing material corresponds is removed, to define the cable aperture of the corresponding required diameter through the sealing material.

* * * * *